US008620918B1

United States Patent
Ben-Artzi et al.

(10) Patent No.: US 8,620,918 B1
(45) Date of Patent: Dec. 31, 2013

(54) CONTEXTUAL TEXT INTERPRETATION

(75) Inventors: Aner Ben-Artzi, Los Angeles, CA (US); Kirill Buryak, Sunnyvale, CA (US); Glenn M. Lewis, Costa Mesa, CA (US); Jun Peng, San Ramon, CA (US); Nadav Benbarak, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/364,177

(22) Filed: Feb. 1, 2012

Related U.S. Application Data

(60) Provisional application No. 61/438,471, filed on Feb. 1, 2011, provisional application No. 61/483,498, filed on May 6, 2011.

(51) Int. Cl.
*G06F 7/00* (2006.01)
*G06F 17/30* (2006.01)

(52) U.S. Cl.
USPC ............................ 707/737; 707/738; 707/739

(58) Field of Classification Search
USPC .......................................... 707/737, 738, 739
See application file for complete search history.

(56) References Cited

U.S. PATENT DOCUMENTS

| 7,062,535 B1* | 6/2006 | Stark et al. | 709/206 |
| 7,451,389 B2* | 11/2008 | Huynh et al. | 715/230 |
| 8,311,805 B2* | 11/2012 | Parikh | 704/9 |
| 2007/0214130 A1* | 9/2007 | Miller | 707/5 |

* cited by examiner

*Primary Examiner* — Mariela Reyes
(74) *Attorney, Agent, or Firm* — Fish & Richardson P.C.

(57) ABSTRACT

Among other disclosed subject matter, a computer-implemented method includes receiving a plurality of electronic documents associated with a domain at a server. Each of the plurality of electronic documents includes meta-data and textual content. The method includes identifying one or more text strings in the textual content that are to be processed differently than an identical or similar text string in other electronic documents, and associating, with the electronic document, data indicating that each of the identified text strings is to be processed differently than an identical or similar text string in other electronic documents. The method also includes performing an analysis of the electronic documents to identify one or more subsets of the electronic documents that include related subject matter. A plurality of degrees of relatedness can be associated with text strings associated with data indicating that each of the text strings is to be processed differently.

28 Claims, 5 Drawing Sheets

116a

> From: Sherman, Jack (JS11@xyz.com)
> To: Martin, Bill (bmartin@techsupport.acme.com)
>
> 502
>
> Dear Bill,
> Thank you for taking the time to walk me through the initial setup. However, I am still experiencing problems with my modem. Are you, or another technical support representative available to help me get my modem to work?
>
> Sincerely,
> Jack 116b > From: Jones, Jill (docjones@abc.com)
> To: Customer Support (support@Acme.com)
>
> To whom it may concern,
> I believe I was over charged $100.00. I received last month's bill, and the bill indicates I owe $5000.00. However, the contract states that I owe $4900.00 each month. I have attached the disputed bill and a copy of my contract. Please call me at 212-555-5555 to discuss this further.
>
> Thank you,
> Jill

FIG. 5

CONTEXTUAL TEXT INTERPRETATION

CROSS-REFERENCE TO RELATED APPLICATION

This application claims priority to U.S. Provisional Application No. 61/438,471, filed on Feb. 1, 2011, and U.S. Provisional Application No. 61/483,498, filed on May 6, 2011. The disclosure of the prior application is considered part of and is incorporated by reference in the disclosure of this application.

BACKGROUND

This specification relates to contextual text interpretation.

Internet users can submit various electronic documents to various entities, e.g., businesses and organizations, to communicate with these entities. These electronic documents can include e-mail messages, messages submitted using an online form, messages posted to an Internet forum or bulletin board, online surveys, etc. The electronic documents can convey various messages or sentiments to the entities and/or for viewing by other online users. For example, the electronic documents can pose questions, raise complaints, provide suggestions, requests for technical assistance or support and/or offer advice.

SUMMARY

This specification describes technologies relating to contextual interpretation of text.

In general, one innovative aspect of the subject matter described in this specification can be embodied in methods that include the actions of receiving a plurality of electronic documents associated with a domain at a server, wherein each of the plurality of electronic documents includes meta-data and textual content; for each electronic document in at least a subset of the plurality of electronic documents: identifying one or more text strings in the textual content that are to be processed differently than an identical or similar text string in other electronic documents based on the meta-data associated with the electronic document; and associating, with the electronic document, data indicating that each of the identified text strings is to be processed differently than an identical or similar text string in other electronic documents; and performing an analysis of the electronic documents to identify one or more subsets of the electronic documents that include related subject matter, wherein a first degree of relatedness of subject matter is associated with identical or similar text strings that do not have associated data indicating that each of the identical or similar text strings is to be processed differently; and wherein a second degree of relatedness of subject matter, different than the first degree of relatedness, is associated with identical or similar text strings, in which one of the text strings has associated data indicating that the text string is to be processed differently and the other text string does not have data indicating that the text string is to be processed differently.

In general, another innovative aspect of the subject matter described in this specification can be embodied in methods that include the actions of receiving a plurality of electronic documents at a server, wherein the plurality of electronic documents is associated with a domain; for each document within a subset of the plurality of electronic documents associating a token with an identified text string in the electronic document, wherein the text string is identified based on at least one of meta-data included in the electronic document and contextual information, wherein a particular token is associated with a first text string in a first electronic document and a different, second text string in a second electronic document; and analyzing the documents to identify relationships based on at least in part on the tokens within the documents.

These and other embodiments can each optionally include one or more of the following features. The method can include generating a modified electronic document, wherein the data associated with each identified text string is included in the modified electronic document. The method can also include ignoring a particular text string as a potential feature for use in clustering documents if the particular text string has been identified to be processed differently. The method can also include using a particular text string as a potential feature for use in clustering documents if the particular text string has not been identified to be processed differently. The method can also include treating a particular text string as a feature with a reduced clustering weight if the particular text string has been identified to be processed differently.

In general, another innovative aspect of the subject matter described in this specification can be embodied in methods that include the actions of receiving an electronic document at a server. The electronic document includes user-generated content received from a user. The methods include analyzing the electronic document to identify a particular text string to be processed differently than other text in the electronic document for classifying the electronic document. The particular text string is identified based on at least one of meta-data included in the electronic document or a contextual use of the particular string. The methods include generating a modified electronic document derived from the electronic document for use in classifying the electronic document. The methods include storing an indication in the modified electronic document that the particular text string is to be processed differently than other text in the electronic document during classification of the electronic document. The methods include normalizing the particular text string in the modified electronic document.

These and other embodiments can each optionally include one or more of the following features. Normalizing the particular text string can include replacing the particular text string with a token indicating a range associated with the particular text string. Normalizing the particular text string can include replacing the particular text string with a token, wherein the token includes at least a portion of the particular text string. Normalizing the particular text sting can include replacing the particular text string in the modified electronic document with a token. Normalizing the particular text string includes deleting the particular text string from the modified electronic document. The meta-data can include at least one of author information, information indicating a geographic location, or date information. The particular text string can include at least one of a numeric string, a user ID, a name, an URL, an email address, or a date. The methods can include using a clustering algorithm to classify the electronic document. The clustering algorithm classifies the electronic document based on content of the modified electronic document other than the particular text string. The methods can include analyzing the indication to determine whether to use the text string in performing the clustering algorithm. The contextual use associated with the particular text string includes a salutation, a signature, a letter closing, an address, or an indicator of currency. The particular text string is further identified based on a database, wherein the database includes information associated with an Internet forum.

In general, another innovative aspect of the subject matter described in this specification can be embodied in computer storage medium encoded with a computer program comprising instructions that when executed cause a computer to: receive an electronic document, wherein the electronic document includes user-generated content received from a user; analyze the electronic document to identify a particular text string to be processed differently than other text in the electronic document for classifying the electronic document, wherein the particular text string is identified based on at least one of meta-data included in the electronic document or a contextual use of the particular string; generate a modified electronic document derived from the electronic document for use in classifying the electronic document; store an indication in the modified electronic document that the particular text string is to be processed differently than other text in the electronic document during classification of the electronic document; and normalizing the particular text string in the modified electronic document.

These and other embodiments can each optionally include one or more of the following features. The computer program can include instructions that when executed cause the computer to normalize the particular text string by replacing the particular text string in the modified electronic document with a token. The computer program can include instructions that when executed cause the computer to normalize the particular text string by deleting the particular text string from the modified electronic document. The computer program can include instructions that when executed cause the computer to normalize the particular text string in the modified electronic document by replacing the particular text string with a token, wherein the token includes at least a portion of the particular text string. The computer program can include instructions that when executed cause the computer to normalize the particular text string in the modified electronic document by replacing the particular text string with a token indicating a range associated with the particular text string. The meta-data can include at least one of author information, information indicating a geographic location, or date information. The particular text string includes at least one of a numeric string, a user ID, a name, an URL, an email address, or a date. The electronic document includes an electronic message, a message associated with an Internet forum or a survey. The computer program can include instructions that when executed cause the computer to execute a clustering algorithm to classify the electronic document wherein the clustering algorithm classifies the electronic document based on content of the modified electronic document other than the particular text string. The clustering algorithm analyzes the indication to determine whether to use the text string in the clustering algorithm. The contextual use associated with the particular text string can include a salutation, a signature, a letter closing, an address, or an indicator of currency. The particular text string is further identified based on a database, wherein the database includes information associated with an Internet forum.

In general, another innovative aspect of the subject matter described in this specification can be embodied in a system that includes a storage device; and one or more computers operable to interact with the storage device and to: receive an electronic document, wherein the electronic document includes user-generated content received from a user; analyze the electronic document to identify a particular text string to be processed differently than other text in the electronic document for classifying the electronic document, wherein the particular text string is identified based on at least one of meta-data included in the electronic document or a contextual use of the particular string; generate a modified electronic document derived from the electronic document for use in classifying the electronic document; store the modified electronic document in the storage device; store an indication in the modified electronic document that the particular text string is to be processed differently than other text in the electronic document during classification of the electronic document; and normalize the particular text string in the modified electronic document.

These and other embodiments can each optionally include one or more of the following features. The one or more computers can include a server operable to interact with a user device through a data communication network and to receive the user-generated content from the user device. The one or more computers can be operable to store the normalized text string in the modified electronic document. The one or more computers can be operable to normalize the particular text string in the modified electronic document by replacing the particular text string with a token indicating a range associated with the particular text string. The one or more computers can be operable to replace the particular text string in the modified electronic document with a token. The one or more computers are operable to normalize the particular text string in the modified electronic document by deleting the particular text string from the modified electronic document.

Particular embodiments of the subject matter described in this specification can be implemented so as to realize one or more of the following advantages. Electronic documents can be analyzed to determine portions of text that provide limited value when classifying the documents using a clustering algorithm. This allows the clustering algorithm to ignore portions of text and prevents the clustering algorithm from misclassifying a document or from being misled. As a result, the documents can be classified with greater accuracy and the topics can be properly identified. In addition, the electronic documents can be anonymized such that personal information such as a person's name or email address can be modified so the person's name or other identifying/personal information is removed, obscured, or replaced with a token.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 illustrates example documents received at a server.

Like reference numbers and designations in the various drawings indicate like elements.

DETAILED DESCRIPTION

In general, a system receives a user generated electronic document, such as an email, an electronic message submitted through a website or an online form, a message posted on an Internet forum, an online user group or a bulletin board or a survey and analyzes the document's text to identify text strings that are of limited value when classifying the document (e.g., articles, salutations, names or user IDs) or of limited value when identifying topics, keywords or similarities between documents. The text string can be identified based on the context of the text string. For example, a text string can be identified as having limited value when classifying the document by analyzing text near the text string and using various contextual signals (e.g., salutations, letter closings, punctuation, rules to interpret regular expressions and lists of common terms). In addition, the system may refer to meta-data associated with the document, such as date information, the sender's name, the intended recipient's name etc., to identify the text string. The system can store the identified text string in a database that is accessed by a clustering engine that can identify topics or issues contained in documents. The system can also associate a tag or other data with a text string and/or document to indicate that the text string is of limited value when classifying the document. The clustering engine can analyze the documents, identify keywords or features contained in the documents and group the documents such that the documents are grouped according to topics or issues contained in the documents. Using the database, the clustering engine can prevent the clustering algorithm from clustering the document based on the identified text string. This reduces and/or eliminates errors in the clustering/classification of documents. In addition, the system can normalize or replace the identified text string with a descriptor, a numeric range or other token. For example, a personal name (e.g., "John" or "Jill Smith") can be replaced with a token such as "NAME" or "NAME_John." The document can be stored in a database and a clustering algorithm can be applied to the documents included in the database to classify the document or identify the topics included in the documents.

Figure 1:
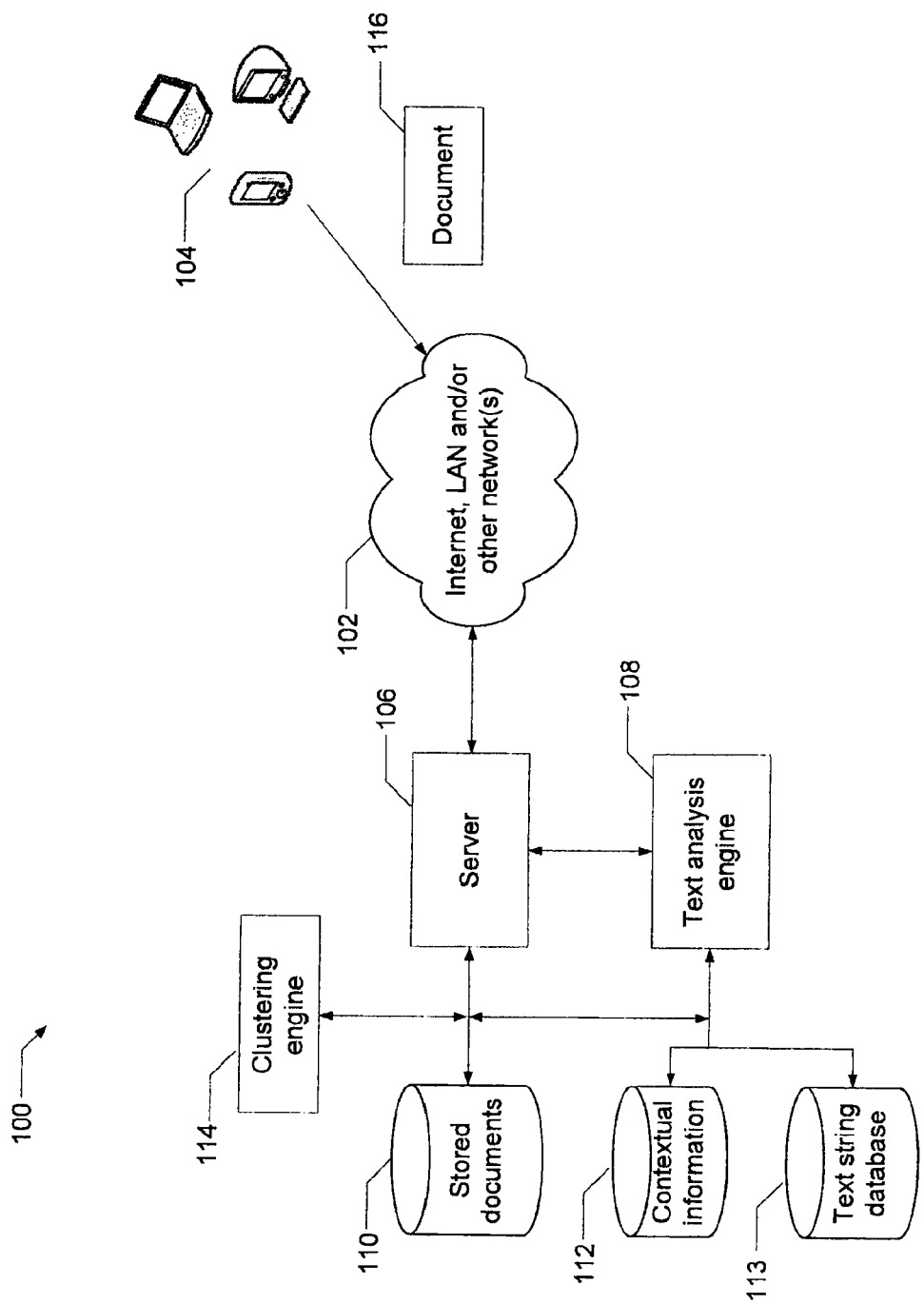
FIG. 1 is a block diagram of an example environment in which a text analysis system performs contextual text interpretation.

FIG. 1 is a block diagram of an example environment 100 in which a text analysis system performs contextual text interpretation. The example environment 100 includes a network 102, a user device 104, a server 106, a text analysis engine 108, a stored documents database 110, a contextual information database 112, a text string database 113 and a clustering engine 114. Although FIG. 1 illustrates a single user device 104, multiple user devices 104 can be included in the environment 100.

The network 102 can be any type of network such as a local area network (LAN), wide area network (WAN), the Internet, or a combination thereof. The network 102 facilitates connectivity between the user device 104, the server 106, the text analysis engine 108, the stored documents database 110, the stored contextual information 112 and the clustering engine 114.

The user device 104 can be any type of device capable of accessing the network 102. For example, the user device 104 can be a computer, a laptop, a tablet computer or a smart phone. The user device 104 can be used to transmit an electronic document 116 to the server 106. The electronic document 116 (which for brevity will simply be referred to as a document) can be any type of document such as an email message, a message sent through an online form or website, a message associated with an Internet forum, Internet user group and/or a bulletin board, an electronic survey or a file. The electronic document 116 can be sent by a person using the user device 104 to convey various messages or sentiments. For example, the document 116 can ask questions, answer questions, raise complaints, make suggestions, requests for technical assistance or support and/or provide troubleshooting suggestions. In some implementations, the document 116 is directed to a business or organization.

In some implementations, the document 116 includes or is associated with meta-data. The meta-data can include information such as the sender's name, the recipient's name, geographical information and/or routing information. The user device 104 and/or servers used to transmit the document 116 can associate the meta-data with the document 116.

The server 106 can be any type of server that can receive the electronic document 116 through the network 102. Generally, the server 106 receives a large number of documents 116 that originate from various user devices 104. The server 106 can be configured to add meta-data (or additional meta-data) to the electronic document when the document 116 is received. In some implementations, the server 106 can add meta-data related to the date and time the message was received/transmitted or other information associated with the sender. For example, if the document 116 was submitted through an online form, the server 106 can add meta-data to the document 116 indicating the date and time the message was submitted and the name, phone number, email address, the URL of the web-based form or other information associated with the document 116. In some implementations, meta-data associated with the geographic location from which the document 116 originated is associated with the document 116. The geographic location can be determined by the IP address or other information associated with the transmission of the document 116. In some implementations, the server 106 stores the document 116 in the stored documents database 110.

The text analysis engine 108 can receive the document 116 from the server 106 or access the document 116 from the stored documents database 110. The text analysis engine 108 can analyze the document's text and identify text strings that should be processed differently than other text in the electronic document for classifying the document. For example, the text analysis engine 108 can identify text strings that are not relevant or provide limited value for classifying the document (i.e., non-clustering text strings). Non-clustering text strings are sometimes referred to as a local stop word (i.e., a text string that has limited value for classifying the particular document containing the text string). Example non-clustering text strings can include the author's name, the author's email address, the author's phone number, the recipient's name, the recipient's email address, user IDs associated with an Internet message board, Internet forum and/or bulletin board (e.g., "BigDog17" or "BigTalker00"), URLs, monetary amounts, salutations, letter closings and/or certain date information. The text analysis engine 108 can identify text strings that should be processed differently than other text in the electronic document based on contextual signals associated with the text string.

For example, the text analysis engine 108 can access the contextual information database 112 which can include a dictionary or database identifying contextual signals to be used to determine a text string's meaning Example contextual signals include common salutations, letter closings, punctuation, currency symbols, words denoting currency, capital or lower case letters, indicators of a date or rules to interpret the contextual meaning of a text string. Example rules that can be used to interpret the contextual meaning of a text string include rules to interpret regular expressions ("Dear John,"), rules based on the location of text in a document, rules to interpret email addresses and URLs, rules to interpret dates and/or grammatical rules. The database 112 can also include lists of names, cities, countries and zip codes that can be used by the text analysis engine 108 to interpret the contextual meaning of a text string or to determine if a text string is a non-clustering text string.

The text analysis engine 108 can identify a non-clustering text string by analyzing text strings (e.g., a character, a group of characters, a word or a group of words) included in the document 116 and the text near a particular text string. In some implementations, the text analysis engine 108 can analyze a particular text string and analyze the words or punctuation immediately before and/or after the text string to determine whether the text string is a non-clustering text string. For example, the text analysis engine 108 can determine a text string is a personal name (e.g., "John" or "Karen") if the word immediately preceding the text string is a salutation, such as "hello" or "dear," and/or the text string is followed by punctuation, such as a comma or a colon. In addition, in some implementations, the text analysis engine 108 can use the location of a text string to determine whether a text string is a non-clustering text string. For example, if a text string is at the beginning of a message and followed by punctuation (e.g., "," or ":"), the text analysis engine 108 can determine that the text string likely is a name. Similarly, if the text string is at the end of a message, the text analysis engine 108 can determine that this is a signal indicating that the text string is a name or a letter closing (e.g., "sincerely" or "best regards"). In some implementations, the text analysis engine 108 can determine that text strings at the end of a document 116 that follows a name are address information, other contact information and/or notable quotes commonly included in an author's message signature.

In some implementations, the text analysis engine 108 can determine if a text string is a monetary value by determining whether the text before or after the text string is a currency symbol or denotes a currency. For example, the text analysis engine 108 can identify a text string equal to "38.16" as monetary value if a "$" or a "£" precedes the text string or if the text string is followed by "₵." In addition, if the text string "38.16" is near words denoting currency, such as "dollars" or "euro," then the text analysis engine 108 can determine that the text string is a monetary amount and not relevant in a clustering analysis to classify the document. In some implementations, the text analysis engine 108 can determine that a numerical value is a monetary amount if text near the numerical value is commonly associated with monetary amounts. For example, the text analysis engine 108 can determine a text string is a monetary amount if the text string is near words, such as "charged," "owed," "paid," or "billed." In some implementations, the text analysis engine 108 can determine that a text string is a monetary amount because the text string is composed of two numerical portions that are separated by a symbol such as a "." or ",".

Similarly, the text analysis engine 108 can determine if a text string is a date by analyzing text near the text string. For example, if the text string is "January," and the text following "January" is a numerical value between 1 and 31, the text analysis engine 108 can determine the text string and the following numerical value should be combined into one text string and that the combined text string is a non-clustering text string. Similarly, the text analysis engine 108 can also determine if the text string is followed by a numerical value indicating a year (e.g., Jan. 31, 2011). In some implementations, the text analysis engine 108 can determine a text string is a date if the text string is a numerical value separated by symbols, such as "/" or "-". In some situations, a date can be used to classify a document. For example, dates associated with service outages, weather or natural disaster problems or other events can be used to classify a document.

The text analysis engine 108 can also infer the format of the date information based on meta-data associated with the document 116 that indicates from where the message originated. For example, if the meta-data indicates that the message originated from Europe, the text analysis engine 108 can determine that a date could have a format with the date string preceding the month (e.g., 12 March, "30-12" or 29-January).

The text analysis engine 108 can also identify a non-clustering text string by analyzing meta-data associated with the document 116. For example, the text analysis engine 108 can identify a text string as the author's name by analyzing the meta-data associated with the sender of the document 116 (e.g., meta-data associated with the sender's name or email account information, such as a name that is displayed or associated with the email address). Similarly, the text analysis engine 108 can identify a text string as the recipient's name by analyzing the meta-data associated with the recipient of the document 116 (e.g., meta-data associated with the sender's name or email account information). As another example, the text analysis engine 108 can identify date information included in the document 116 by analyzing the meta-data associated with the time and date the document 116 was received by the server 106. For example, if the document 116 includes a text string "on the 17$^{th}$ of the month," the text analysis engine 108 can analyze the meta-data associated with when the document 116 was received and determine which month the text string refers to and that the text string is not useful for clustering or classifying the document.

In some implementations, the text analysis engine 108 uses the meta-data associated with the document 116 to identify a particular text string as non-clustering text strings in one document even though the particular text string could have value for clustering in a different document. For example, if the document 116 includes meta-data identifying the sender or the recipient of the document as "Bill," the text analysis engine 108 can analyze the document 116 and identify the text string "Bill" as a name and a non-clustering text string. However, in a different document 116, the text string "Bill" may be relevant and may refer to a bill for services which can have value in clustering or classifying the document 116.

In some implementations, the text analysis engine 108 can identify a text string as a user ID associated with an Internet forum or message board and determine that the user ID is a non-clustering text string. In some implementations, the text analysis engine 108 can access the contextual information database 112 that can include a database of email addresses and user IDs associated with the email address. For example, the database can include an entry for joe.smith@email.org and a user ID associated with joe.smith@email.org, such as "BigTalker00." The text analysis engine 108 can determine whether a text string is a user ID by comparing the text string to the database or by comparing the text string and the meta-data associated with the author of the message to the database to determine if there is a match.

In some implementations, if the text analysis engine 108 determines that the document 116 includes a user ID, the text analysis engine 108 can determine whether other user IDs are included in the document 116. For example, the document 116 can be a message on an Internet forum that is a message replying to an earlier message and includes a user ID (each associated with an email address) associated with the earlier message. In addition, the document 116 can be a chain of messages from a group of different authors each associated with a particular user ID. The text analysis engine 108 can compare text strings to the database to determine whether other user IDs are included in the document 116.

After the text analysis engine 108 identifies a non-clustering text string, the text analysis engine 108 can store the non-clustering text string in a text string database 113. In some implementations, the text analysis engine 108 also stores information identifying the document 116 that includes the non-clustering text string in the text string database 113 such that the non-clustering text string is linked to the document 116. For example, the text string database 113 can be searched and all of the non-clustering text strings included in a document 116 can be identified. The text string database 113 can be accessed by the clustering engine 114 to determine the text strings in the document 116 that should not be used by the clustering algorithm (i.e., non-clustering text strings). The clustering engine 114 and the clustering of documents are described below.

In some implementations, the text analysis engine 108 can associate a tag or other data with each non-clustering text string to indicate that the text string is a local stop word. For example, the text analysis engine 108 can associate a tag such as "NCTS" (non-clustering text string) to indicate that the associated text string is a local stop word. In some implementations, the text analysis engine 108 can use tags that indicate that the type of local stop word, e.g., an author or recipient. For example, a tag, such as "NCTS-Recipient" can be used to indicate that the text string is the recipient's name or email address and it is a non-clustering text string. In some implementations, the text analysis engine 108 can use a tag that includes at least a portion of the text string. For example, a tag, such as "NCTS-Sender-Jack" or "NCTS-Author-Jack" can be used to indicate that the author's name is Jack and the text string "Jack" is a local stop word. In some implementations, the tags are similar to the tokens described above.

The text analysis engine 108 can also process the document such that the non-clustering text strings are normalized. In some implementations, the text analysis engine 108 can normalize a non-clustering text string by replacing the non-clustering text string with a user-specified token (or token format) that includes all or a portion of the non-clustering text string. For example, the text analysis engine 108 can replace a "John" with a token such as "N1_John" or "Name_John" and the token format would be consistently used. In some implementations, the text analysis engine 108 can replace the non-clustering text string with a token that describes the text string generally without including the original value of the string, such as "NAME" or "MONETARY AMOUNT." In some implementations, the tokens can be used to anonymize personal information or can be used by the clustering engine 114 to determine what text strings should not be used as a feature (e.g., to identify black listed words). In some implementations, the text analysis engine 108 can delete the non-clustering token from the document 116. In some implementations, a copy of the document 116 is created before normalizing the non-clustering text strings.

In some implementations, monetary amounts can be normalized such that the monetary amount is replaced with a token or descriptor indicating the currency type. For example, the text analysis engine 108 can replace the amount "$100" or "100 dollars" with "USD_100" and the amount "£199" with "GBP_199." In some implementations, the text analysis engine 108 can normalize currency amounts and replace the monetary amount with a single currency type. For example, the text analysis engine 108 can identify a monetary amount that is in British Pounds (e.g., "£199") and replace the monetary amount with a token associated with the U.S. Dollar (e.g., "USD_328") using the appropriate exchange rate (e.g., British Pound to U.S. Dollar Exchange). The text analysis engine 108 can access a currency exchange database to determine the current exchange rate. In some implementations, the token includes the exchange rate used to normalize the monetary amount. The text analysis engine 108 can determine the currency type based on currency symbols included in text string and/or near the monetary amount. In some implementations, if the text string and/or the text near the text string does not indicate the currency type, the currency type can be determined from the meta-data associated with the document that indicates the geographic location from which the document originated. For example, if the meta-data indicates that the document 116 originated from an IP address located in China, the text analysis engine 108 can determine that the monetary amount is Yuan.

In some implementations, the text analysis engine 108 can replace a numerical value identified as a non-clustering text string with token that represents a numerical range. The token can indicate an order of magnitude (e.g., 10, 100, 1000, etc.) or an upper and lower limit to the range. For example, the text analysis engine 108 can replace a text string equal to "57" with a token that represents a range, such as "RANGE_0_to_100." As a second example, a text string equal to "243" can be replaced by a token, such as "RANGE_128_to_255."

In some implementations, the text analysis engine 108 can replace a date identified as a non-clustering text string with a token that indicates whether the date is a future date or a past date. For example, the text analysis engine 108 can identify a text string identified as a date and compare the identified date to the date the document was created and/or sent by the user, which can be stored in metadata associated with the document or can be stored in the document header (e.g., an email header), to determine if the identified date is in the future or in the past. The text analysis engine 108 can replace the identified date with a token, such as DATE_PAST or DATE_FUTURE depending on whether the identified date is before or after the date the document was created or sent. Other tokens can be used to represent past or future dates, such as DATE_PAST_MONTH or DATE_FUTURE_WEEK.

The clustering engine 114 can access the stored documents database 110 and cluster documents 116 to classify the documents 116 or to discover topics included in the documents 116. The topics can be any topic contained in the documents 116, such as billing issues, customer complaints, technical support issues related to a particular product, questions or comments related to a particular product or service, etc. Various clustering algorithms can be used by the clustering engine 114. For example, the clustering engine 114 can use a distributed exchange algorithm to cluster the documents and classify the documents 116 or discover the topics included in the documents 116. In some implementations, the clustering engine 116 attempts to group the set of relevant resources in various groupings until an optimal or near optimal grouping is identified. Typically, the resources contained in an optimal or near optimal grouping are all resources that are related or describe a similar topic.

In some implementations, the clustering engine 114 applies an information retrieval algorithm or text mining algorithm, such as a term frequency-inverse document frequency algorithm, before the clustering the documents 116. The information retrieval algorithm or text mining algorithm is applied to the documents to identify features, such as the relevant text included in the documents (e.g., product names, services, keywords, competitors' names) or meta-data associated with the resources, that may be useful for classifying documents and ignore the non-clustering text strings included in the documents. For example, the clustering engine 114 can apply the term frequency-inverse document frequency algorithm to a document or the collection of documents to determine scores that represent the number of times particular text occurs in a document divided by the number of times the same text occurs in a collection of resources. The clustering engine 114 can determine that text that appears in a document at a higher frequency than the collection of resources is a feature (e.g., relevant text) in the document. For example, the clustering engine 114 can access the text string database 113 and determine which text strings in the documents 116 should be ignored by the information retrieval algorithm or text mining algorithm. In some implementations, the information retrieval algorithm or text mining algorithm can ignore tokens or descriptors used to replace the non-clustering text strings. In some implementations, the information retrieval algorithm or text mining algorithm can ignore a text string associated with a flag or other data indicating that the text string is a non-clustering text string/local stop word. In some implementations, the information retrieval algorithm or text mining algorithm can ignore particular tokens or descriptors and but not ignore other tokens. For example, the information retrieval algorithm or text mining algorithm can consider a token indicating a numerical range as a feature but ignore a token indicating a name or salutation. The user of the server 106 and/or text analysis engine 108 can create rules specifying which tokens should be ignored and which tokens should not be ignored by the text mining algorithm.

In some implementations, the clustering engine 114 can cluster documents based on the tokens or tags. For example, in some implementations, the clustering engine 114 can cluster documents that include a token indicating a particular range, e.g., RANGE__128_to__255. In some implementations, the clustering engine 114 can cluster documents that include text strings associated with the same or similar tags. For example, documents that include the tag NCTS-Sender-Jack can be clustered with other documents that also include an identical tag NCTS-Sender-Jack or a similar tag NCTS-Sender-John.

In some implementations, the clustering engine 114 and/or the information retrieval algorithm can identify a text string associated with a tag as a local stop word. For example, the clustering engine 114 can identify the text string "Chip," which is the document author's name, as a local stop word that is not used when clustering the document with other documents. This can prevent the clustering engine 114 from identifying the document as being related with another document that includes the text string "chip" or "chips," where the use of "chip" refers to a microchip or a potato chip or to another document that is about a person named Chip rather than authored by a person named Chip.

The clustering engine 114 can identify documents that contain an identical text string (or similar text string) as being related. For example, the clustering engine 114 can identify two documents as being related because they both include the text string "sailing." In some implementations, the clustering engine 114 can identify two documents as being related because they both include the same token or flag.

In some implementations, the clustering engine 114 can identify different levels of relatedness between documents. For example, the clustering engine can identify a level of relatedness between documents based on whether the documents include the same text string and identify a different level of relatedness between documents based on whether the documents include related or similar text strings. Additional factors that can be used to identify different levels of relatedness between documents include whether the documents include a token indicating the same data type, range, or classification of a text string and whether the documents include the same local stop word. In some implementations, the clustering engine 114 can assign the same level of relatedness to documents that are related based on different reasons. For example, the clustering engine 114 can assign the same level of relatedness to documents that include the same text string and documents that include related or similar text strings.

In some implementations, the clustering engine 114 can treat a local stop word as a feature having some weight for clustering purposes. For example, instead of ignoring a local stop word, the clustering engine 114 can treat the non-clustering text string as a partial feature (i.e., a feature for clustering having less significance than a text string that is not associated with a tag). As such, the clustering engine 114 can identify a level of relatedness between two documents based on a text string, even though the text string is a local stop word in one of the documents.

Figure 2:
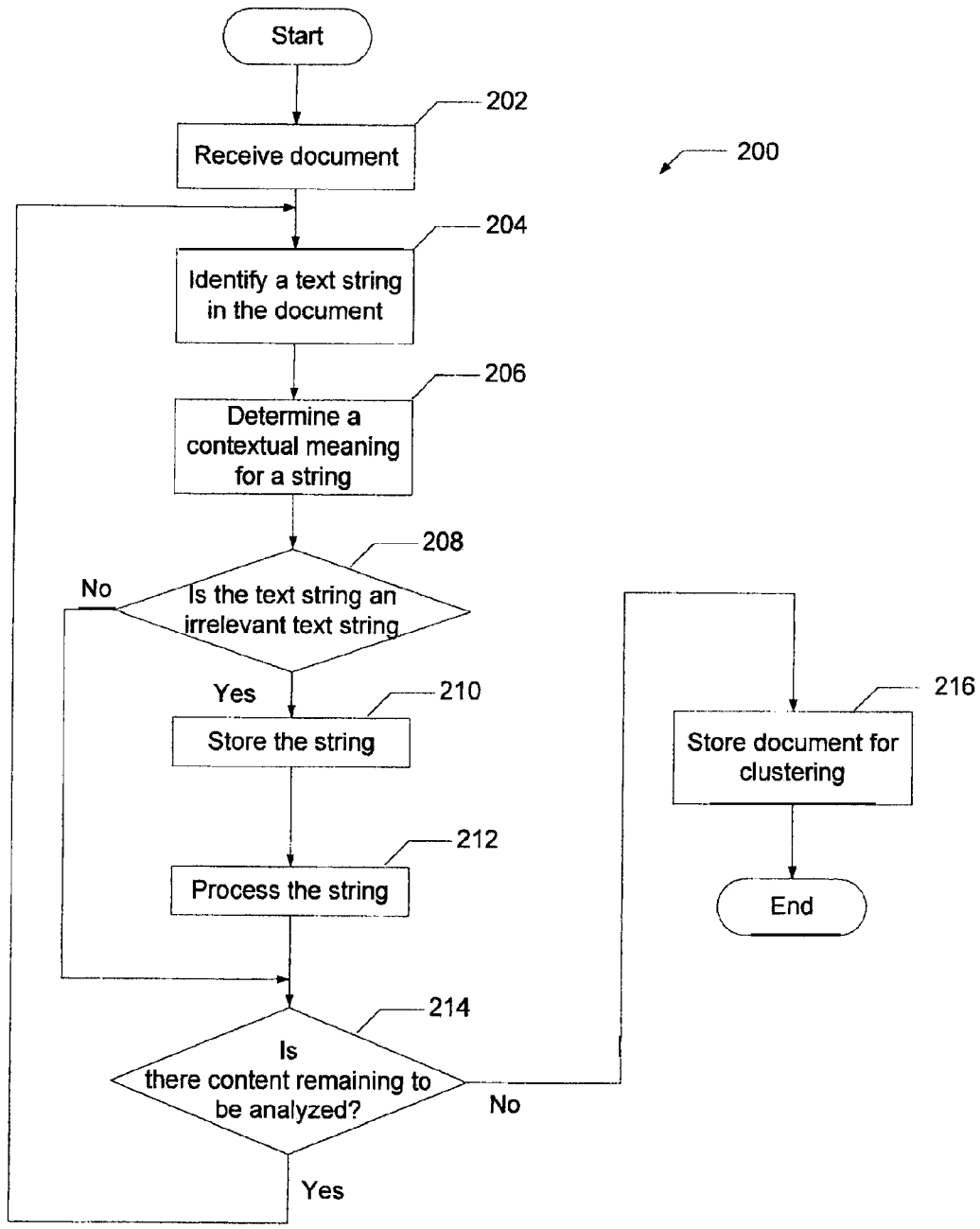
FIG. 2 is a flowchart of an example process for performing contextual text interpretation.

FIG. 2 is a flowchart of an example process for performing contextual text interpretation. The process 200 begins by receiving an electronic document at a server (at 202). For example, a document 116 can be transmitted to a server 106 from a user device 104. The document 116 can be an email message, a message submitted to the server 106 using an online form or website or a message associated with an Internet forum or message board. In some implementations, the server 106 can add meta-data to the document 116, such as meta-data related to the date the message was received, meta-data related to the author's name or email address and/or meta-data related to the geographic area from which the document 116 originated from.

At 204, a text string in the document is identified. For example, the text analysis engine 108 can analyze the text of the document and identify a character, a group of characters, a word or a group words as a text string. Various methods can be used to identify the text string. For example, in some implementations, the text analysis engine 108 can parse text strings based on white space or characters that are not numbers or letters (e.g., punctuation marks, mathematical symbols, end of line characters and/or tab characters) or can use various rules provided by the operator of the text analysis engine 108 to parse text strings.

At 206, the contextual meaning of the text string is determined. For example, the text analysis engine 108 can determine whether the text string is a personal name, an email address, a monetary amount, salutation, and/or a date (i.e., irrelevant text strings) by analyzing the text string, text near the text string (e.g., is the text string preceded by text representing a salutation or a letter closing), the location of the text string (e.g., is the text string at the beginning or end of the document 116) and/or meta-data associated with the document (e.g., meta-data associated with the author's name or email address). The types of text strings classified as a "non-clustering text string" can be determined by the user of the text analysis engine 108 and/or the operator of the server 106. In some implementations, the text analysis engine 108 can determine that the text string is a user ID that is used in connection with an Internet forum or message board. For example, the text analysis engine 108 can analyze the text string and meta-data associated with the sender of the email and compare this information to user IDs and email addresses stored in the contextual information database 112.

If the text string is determined to be a non-clustering text string (at 208), the text string is stored in a database (at 210). For example, the text analysis engine 108 can store the text string in the text string database 113, which can be accessed by the clustering engine 114, to identify text strings that should not be used as a feature by the clustering engine 114.

In some implementations, the text string is processed (at 212). For example, the text string can be normalized such that the text string is replaced with a token or descriptor that incorporates the text string. For example, the text analysis engine 108 can replace the name "John" with the token "NAME_JOHN" or the text string "$100" with "USD_100." The text string can also be replaced with a token or descriptor that does not incorporate the text string but generally describes the meaning of the text string. For example, the name "William" can be replaced with the token "NAME" or the number "444" can be replaced with "NUMERICAL VALUE." In addition, numerical values (e.g., monetary amounts or other numbers) can be replaced with a token or descriptor indicating a range of numbers (e.g., "RANGE_0_to_100") or an order of magnitude (e.g., "10^1" or "10^2"). The text analysis engine 108 can also delete the text string from the document 116. For example, the text analysis engine 108 can delete non-clustering text strings, such as a name or a date from the document 116. The text string can be processed as it is identified or it can be processed at a later time (e.g., batch processing). In some implementations, a copy of the document is created and the text string is processed in the copy of the document.

After the text string is processed (at 212) or if the text string is determined to not be a non-clustering text string (at 208), the process 200 continues and determines whether any text in the document 116 remains to be analyzed (at 214). For example, the text analysis engine 108 can use various algorithms to determine whether all of the text has been analyzed. In some implementations, the text analysis engine 108 determines whether all of the text has been analyzed by determining whether the next text string is an end-of-file indicator/character or if there is no text following the text string. If there is text remaining to be analyzed (at 214), the process 200 identifies the next text string to be analyzed (at 204).

If there is no text remaining to be analyzed (at 214), the document is stored in a database (at 216). For example, the text analysis engine 108 can store the document 116 in the stored documents database 110 that can be accessed by the clustering engine 114. Although not shown in process 200, a clustering algorithm can be applied to the document and other documents contained in the stored documents database 110 to classify the documents or identify topics included in the documents. For example, the clustering engine 110 can process the documents contained in the stored documents database 110 to identify a list of text strings that can be used as a feature and apply a distributed exchange algorithm to classify the documents.

Figure 3A:
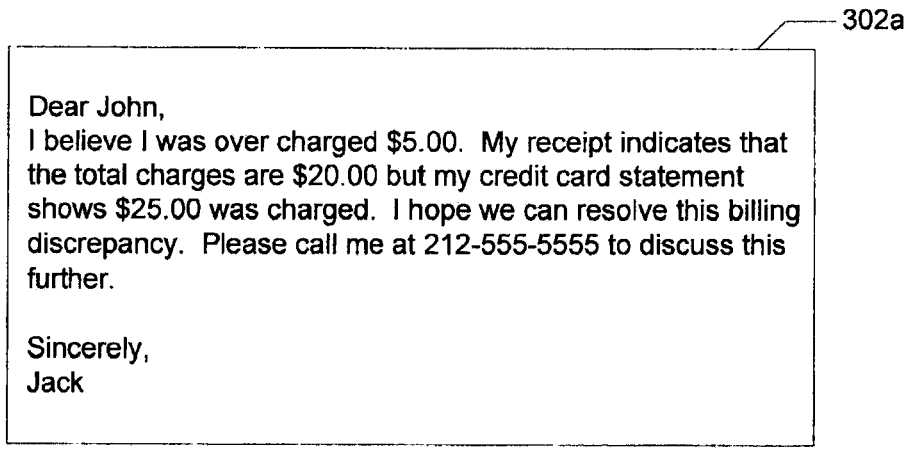
FIGS. 3a and b illustrate an example document before and after normalization.
Figure 3B:
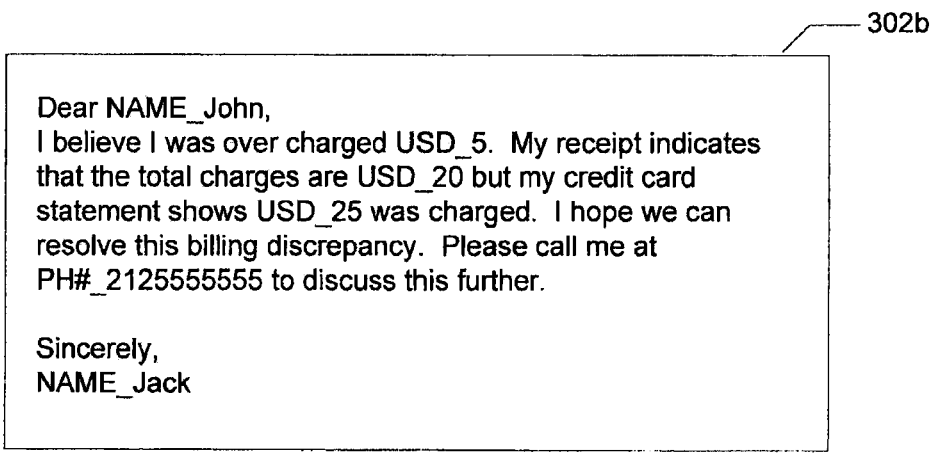

As an illustrative example, FIGS. 3a and 3b illustrate an example document before and after normalization. Document 302a is a user generated document such as an email or message submitted using an online form. After the document is received at the server 106, the text analysis engine 108 can analyze the text of the document and identify non-clustering text strings. For example, the text analysis engine 108 can identify "John" and "Jack" as a name, "$5.00," "$25.00" and "$20.00" as monetary amounts and "212-555-5555" as a phone number. These non-clustering text strings can be stored in a database that can be accessed by the clustering engine 114. The text analysis engine 108 can normalize each of the non-clustering text strings by replacing each non-clustering text string with a token. For example, a copy of the document 302a can be created and the copy 302b can be normalized and each non-clustering text string can be replaced with a token based on the text string. Document 302b illustrates the document 302a after the document 302a has been normalized. For example, in document 302b, "John" can be replaced with a token "NAME_John" and "$5.00" can be replaced with the token "$USD_5." Document 30b can be stored in the database 110 and used for clustering.

Figure 4:
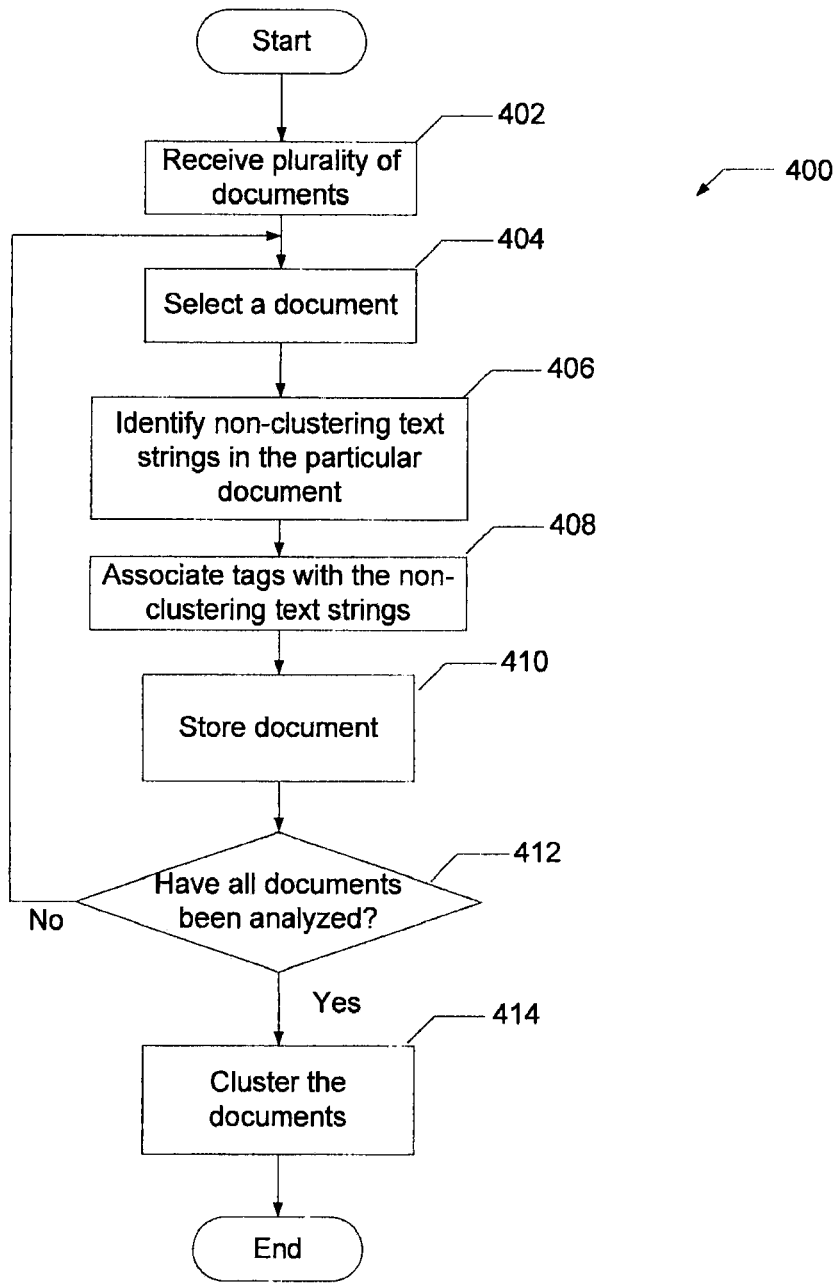
FIG. 4 is a flowchart of an example process for identifying local stop words and clustering documents.

FIG. 4 is a flowchart of an example process for identifying local stop words and clustering documents. The process 400 begins by receiving a plurality of electronic documents (at 402). For example, a server 106 can receive documents 116 over a period of time (e.g., minutes, hours, days) from various user devices 104 and users. The server 106 can store the documents in a database, e.g., the stored documents database 110.

After a number of documents are received, a document is selected from the body of documents (at 404). For example, after a predetermined number of documents have been received or after a time period has expired, the text analysis engine 108 can select the oldest document that has not been clustered or analyzed from the stored documents database 110. As another example, the text analysis engine 108 can select the most recently received document that has not been clustered or analyzed from the stored documents database 110. In some implementation, the text analysis engine 108 can randomly select a document from the stored documents database 110. In some implementations, the text analysis engine 108 can select previously clustered documents that are stored in the documents database 110.

At 406, the document is analyzed to identify local stop words included in the document. For example, text analysis engine 108 can analyze the meta-data associated with the document to determine the recipient's name and then analyze the text of the document 116 to identify appearances of the recipient's name in the document as a local stop words. As an illustrative example, the text analysis engine can analyze the meta-data associated with a document and determine that the recipient's name is "Chip." The text analysis engine 108 then identifies the text string "Chip" in the document as a local stop words. In some implementations the text analysis engine 108 can use the meta-data and contextual information to determine if the text string is a local stop words. For example, using the above example, the text analysis engine 108 can identify the recipient's name as "Chip" and determine that the text string "chip" or similar text strings within the document are local stop words based on contextual information associated with the text strings, such as capitalization, location of the text string (e.g., near a salutation, at or near the beginning of the document), punctuation, etc. Similarly, the text analysis engine 108 can use the contextual information to determine that other uses of "chip" in the document can be a relevant feature for clustering. For example, if "chip" does not appear in the salutation and is not capitalized, the text analysis engine 108 can determine that the text string "chip" is a feature and can be used by the clustering engine 110 to cluster documents. In other implementations, text strings that are identified as local stop words may be treated as a local stop word throughout the document without analyzing contextual information.

At 408, data can be associated with each local stop words. For example, the text analysis engine 108 can associate a tag or other token with each local stop words to indicate that the text string should not be used as a feature when clustering documents. In some implementations, a copy of the document 116 is created and the tag is stored in the copy of the document 116. In some implementations, the text engine 108 replaces the local stop words with the tag in the document 116 or in the copy of the document 116.

The document 116 is stored in the stored document database 110 (at 410). For example, the text analysis engine 108 can store the document 116 and the tags associated with each of the local stop words in the stored document database 110. In some implementations, the text analysis engine 108 can store the copy of the document 116 and the tags associated with each of the local stop words in the stored document database 110.

The text analysis engine 108 determines if all of the documents in the stored documents database 110 have been analyzed to identify non-clustering text strings (at 412). If stored documents database 110 includes documents that have not been analyzed, then the process 400 returns to 404. If the stored documents database 110 does not include documents that have not been analyzed, then the process 400 continues by clustering the documents in the stored documents database 110 (at 414).

At 414, the documents or a subset of the documents in the stored documents database 110 are clustered. For example, the clustering engine 114 can access a group of documents in the stored documents database 110 and cluster the group of documents 116 to classify the documents 116 or to discover topics included in the documents 116. For example, the topics can be any topic contained in the documents 116, such as billing issues, customer complaints, technical support issues related to a particular product, questions or comments related to a particular product or service, etc. Various clustering algorithms can be used by the clustering engine 114. For example, the clustering engine 114 can use a distributed exchange algorithm to cluster the documents and classify the documents 116 or discover the topics included in the documents 116. In some implementations, the documents can be clustered with previously clustered documents that are stored documents database 110 and form new clusters based on the previously clustered documents and documents that have not yet been clustered.

In some implementations, the clustering engine 114 applies an information retrieval algorithm or text mining algorithm, such as term frequency-inverse document frequency algorithm, before clustering the documents 116. The information retrieval algorithm or text mining algorithm is applied to the documents to identify features, e.g., the relevant text included in the documents (e.g., product names, services, keywords, competitors' names) or meta-data associated with the resources, that may be useful for classifying documents and ignore the non-clustering text strings included in the documents. For example, the clustering engine 116 can analyze the tags included in each document 116 to determine which text strings should be ignored by the information retrieval algorithm or text mining algorithm.

In some implementations, the information retrieval algorithm or text mining algorithm can identify a local stop word as a partial feature and treat the local stop word as a partial feature. The clustering engine 114 can use the partial feature as a feature for clustering.

An illustrative example is provided in FIG. 5, which illustrates example documents received at a server. The server 106 can receive documents 116a and 116b from Jack and Jill, respectively. The first document 116a is addressed to "Bill," a representative in the technical support department of Acme Co. The text analysis engine 108 can analyze the meta-data associated with the document 116a and identify the non-clustering text strings. For example, the text analysis engine 108 can use the meta-data associated with the recipient of the document 116a, such as the recipient's name "Bill Martin" to determine that the recipient's first name is Bill. The text analysis engine 108 can then analyze the document 116a to identify appearances of the text string "Bill" as non-clustering text strings. In some implementations, the text analysis engine 108 also uses contextual information associated with a text string to determine whether the text string is a non-clustering text string. For example, the text analysis engine 108 can determine that the text string 502 as a non-clustering text string based on contextual information (e.g., it is a part of the salutation) and is similar to the recipient's name "Bill Martin." The text analysis engine 108 can then associate a tag, such as NCTS, with the text string 502 to indicate that the text string is a local stop word for the document 116a.

The server can also receive the second document 116b, which is addressed to the customer support department of Acme Co. The document 116b includes several instances of the text string "bill," but does not include any meta-data that indicates that the text-string "bill" should be treated as a local stop word. In addition, the document 116b does not include contextual information that indicates the text string "bill" is a local stop word. As a result, the text analysis engine 108 does not associate a tag with any of the instances of the text string "bill." The text string "bill" can be used by the clustering engine 114 as a feature for clustering.

The clustering engine 114 can analyze a set of documents, including documents 116a and 116b, to determine subsets of documents that include related subject matter (e.g., a cluster). For example, the clustering engine 114 can analyze the document 116a and document 116b and determine that, although both documents include the text string "bill," the documents are not related because document 116a includes a tag that indicates the text string "Bill" is a non-clustering text string and is treated as a local stop word. In addition, clustering engine 110 can determine that the documents 116a and 116b are not related because they do not include related subject matter because document 116a is related to a technical support issue and the document 116b is related to a billing dispute.

The clustering engine 114 can analyze document 116b and a third document and identify the text string "bill" as a feature for clustering document 116b and the third document. For example, a third document can be related to a billing issue and include the text string "bill." The clustering engine 114 can determine that the document 116b and the third document are related because both documents include the text string "bill."

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving a plurality of electronic documents associated with a domain at a server, wherein each of the plurality of electronic documents includes meta-data and textual content;
    for each electronic document in at least a subset of the plurality of electronic documents:
        identifying one or more text strings in the textual content that are to be processed differently than an identical or similar text string in other electronic documents based on the meta-data associated with the electronic document; and
        associating, with the electronic document, data indicating that each of the identified text strings is to be processed differently than an identical or similar text string in other electronic documents; and
    performing an analysis of the electronic documents to identify one or more subsets of the electronic documents that include related subject matter,
        wherein a first degree of relatedness of subject matter is associated with identical or similar text strings that do not have associated data indicating that each of the identical or similar text strings is to be processed differently; and
        wherein a second degree of relatedness of subject matter, different than the first degree of relatedness, is associated with identical or similar text strings, in which one of the text strings has associated data indicating that the text string is to be processed differently and the other text string does not have data indicating that the text string is to be processed differently.

2. The computer implemented method of claim 1 further comprising:
    generating a modified electronic document, wherein the data associated with each identified text string is included in the modified electronic document.

3. The computer-implemented method of claim 1, wherein the second degree of relatedness is less than the first degree of relatedness.

4. The computer-implemented method of claim 1, wherein text strings having the second degree of relatedness are treated in the analysis as being unrelated.

5. The computer-implemented method of claim 1, wherein the analysis further includes ignoring a particular text string as a potential feature for use in clustering documents if the particular text string has been identified to be processed differently.

6. The computer-implemented method of claim 1, wherein the analysis includes using a particular text string as a potential feature for use in clustering documents if the particular text string has not been identified to be processed differently.

7. The computer-implemented method of claim 1, wherein the analysis includes treating a particular text string as a feature with a reduced clustering weight if the particular text string has been identified to be processed differently.

8. The computer-implemented method of claim 1, wherein the one or more text strings to be processed differently include at least one of an author name or a recipient name.

9. The computer-implemented method of claim 1, wherein identifying the one or more text strings that are to be processed differently is further based on contextual information associated with the electronic document.

10. The computer-implemented method of claim 9, wherein the contextual information includes at least one of a location of the text string within the electronic document, capitalization associated with the text string, or additional text strings near the text string.

11. A system comprising:
    one or more computers configured to perform operations comprising:
        receiving a plurality of electronic documents associated with a domain at a server, wherein each of the plurality of electronic documents includes meta-data and textual content;
        for each electronic document in at least a subset of the plurality of electronic documents:
            identifying one or more text strings in the textual content that are to be processed differently than an identical or similar text string in other electronic documents based on the meta-data associated with the electronic document; and
            associating, with the electronic document, data indicating that each of the identified text strings is to be processed differently than an identical or similar text string in other electronic documents; and
        performing an analysis of the electronic documents to identify one or more subsets of the electronic documents that include related subject matter,
            wherein a first degree of relatedness of subject matter is associated with identical or similar text strings that do not have associated data indicating that each of the identical or similar text strings is to be processed differently; and
            wherein a second degree of relatedness of subject matter, different than the first degree of relatedness, is associated with identical or similar text strings, in which one of the text strings has associated data indicating that the text string is to be processed differently and the other text string does not have data indicating that the text string is to be processed differently.

12. The system of claim 11, further configured to perform operations comprising:
    generating a modified electronic document, wherein the data associated with each identified text string is included in the modified electronic document.

13. The system of claim 11, wherein the second degree of relatedness is less than the first degree of relatedness.

14. The system of claim 11, wherein text strings having the second degree of relatedness are treated in the analysis as being unrelated.

15. The system of claim 11, wherein the analysis further includes ignoring a particular text string as a potential feature for use in clustering documents if the particular text string has been identified to be processed differently.

16. The system of claim 11, wherein the analysis includes using a particular text string as a potential feature for use in clustering documents if the particular text string has not been identified to be processed differently.

17. The system of claim 11, wherein the analysis includes treating a particular text string as a feature with a reduced clustering weight if the particular text string has been identified to be processed differently.

18. The system of claim 11, wherein identifying the one or more text strings that are to be processed differently is further based on contextual information associated with the electronic document.

19. A non-transitory computer storage medium encoded with a computer program, the program comprising instructions that when executed by one or more computers cause the one or more computers to perform operations comprising:

receiving a plurality of electronic documents associated with a domain at a server, wherein each of the plurality of electronic documents includes meta-data and textual content;

for each electronic document in at least a subset of the plurality of electronic documents:

identifying one or more text strings in the textual content that are to be processed differently than an identical or similar text string in other electronic documents based on the meta-data associated with the electronic document; and associating, with the electronic document, data indicating that each of the identified text strings is to be processed differently than an identical or similar text string in other electronic documents; and performing an analysis of the electronic documents to identify one or more subsets of the electronic documents that include related subject matter, wherein a first degree of relatedness of subject matter is associated with identical or similar text strings that do not have associated data indicating that each of the identical or similar text strings is to be processed differently; and wherein a second degree of relatedness of subject matter, different than the first degree of relatedness, is associated with identical or similar text strings, in which one of the text strings has associated data indicating that the text string is to be processed differently and the other text string does not have data indicating that the text string is to be processed differently.

20. The computer storage medium of claim 19 further comprising:

generating a modified electronic document, wherein the data associated with each identified text string is included in the modified electronic document.

21. The computer storage medium of claim 19, wherein the second degree of relatedness is less than the first degree of relatedness.

22. The computer storage medium of claim 19, wherein text strings having the second degree of relatedness are treated in the analysis as being unrelated.

23. The computer storage medium of claim 19, wherein the analysis further includes ignoring a particular text string as a potential feature for use in clustering documents if the particular text string has been identified to be processed differently.

24. The computer storage medium of claim 19, wherein the analysis includes using a particular text string as a potential feature for use in clustering documents if the particular text string has not been identified to be processed differently.

25. The computer storage medium of claim 19, wherein the analysis includes treating a particular text string as a feature with a reduced clustering weight if the particular text string has been identified to be processed differently.

26. The computer storage medium of claim 19, wherein the one or more text strings to be processed differently include at least one of an author name or a recipient name.

27. The computer storage medium of claim 19, wherein identifying the one or more text strings that are to be processed differently is further based on contextual information associated with the electronic document.

28. The computer storage medium of claim 27, wherein the contextual information includes at least one of a location of the text string within the electronic document, capitalization associated with the text string, or additional text strings near the text string.

\* \* \* \* \*